Patented June 22, 1943

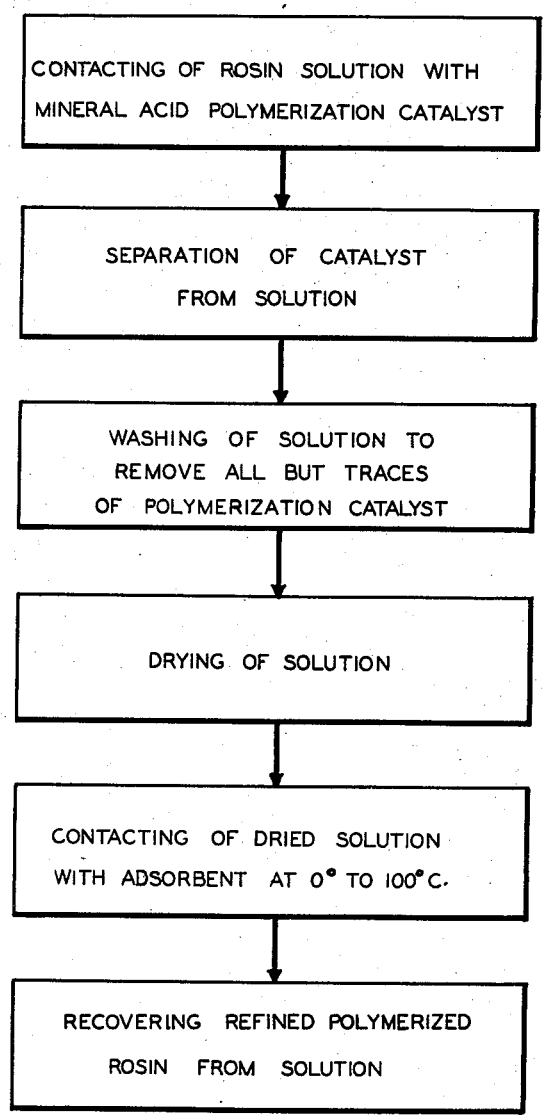

2,322,316

UNITED STATES PATENT OFFICE 2,322,316

METHOD OF REFINING POLYMERIZED ROSIN AND POLYMERIZED ROSIN ESTERS

Alfred L. Rummelsburg, Wilmington, Del., assignor to Hercules Powder Company, Wilmington, Del., a corporation of Delaware Application December 23, 1941, Serial No. 424,139

10 Claims. (Cl. 260—108)

This invention relates to a method for the production of polymerized rosin and polymerized rosin esters in highly refined form.

The polymerization of rosin and rosin esters by contacting with mineral acid polymerization catalysts such as sulfuric acid to give high melting products has been described in the art. The polymerization has generally been carried out by contacting the rosin or rosin ester dissolved in an inert organic solvent with the catalyst. After completion of the polymerization reaction it has been customary to separate the polymerized rosin or rosin ester solution from the catalyst and to wash the solution with water to remove as much of the catalyst as possible. However, it has been impossible to remove the last traces of mineral acid catalyst from the polymerized product and consequently the latter has always been contaminated with traces of the mineral acid. It appears that the mineral acid catalysts form complexes with the polymerized rosin which are not completely removed by water washing. The color of the polymerized rosin or rosin ester resulting from these known procedures also is not as light as desired for most applications.

In some uses of the polymerized products, particularly in the cooking of varnishes or other coating compositions, the traces of mineral acid catalyst have caused an objectionable darkening during the heating operation. In the case of products produced with use of sulfuric acid as catalyst a small trace of sulfur in combined form has always been present in sufficient amount to cause serious darkening in the cooking of certain types of varnishes and in the production of metallic resinates, such darkening apparently being caused by decomposition of the trace of catalyst impurity or reaction of it with metallic constituents to give colored products.

It is an object of this invention to provide a method of removing the last traces of mineral acid catalyst from polymerized rosin and polymerized rosin esters prepared by contacting with a mineral acid catalyst followed by water washing to remove all the catalyst possible by means of water washing. It is another object to provide a method of refining such polymerized rosins and rosin esters which will provide a refined product without any appreciable loss in yield. It is a more specific object to remove the last traces of sulfur contamination from polymerized rosins and rosin esters obtained by use of a sulfuric acid type polymerization catalyst. Other objects of the invention will appear hereinafter.

The above objects are accomplished in accordance with this invention by contacting a solution of a rosin or rosin ester in an inert solvent with a mineral acid polymerization catalyst to effect polymerization thereof, separating the catalyst from the polymerized rosin or rosin ester solution, washing the solution with water thoroughly to remove as much of the mineral acid as possible, drying the solution, then contacting the dried substantially anhydrous solution with from about 5 to about 30 per cent by weight based on the polymerized material of an adsorbent at a temperature within the range of about 0° to about 100° C. for a sufficient period of time to remove the traces of mineral acid catalyst and a substantial portion of the color bodies, and recovering the polymerized product in a highly refined condition from the solution. The attached flow sheet illustrates the separate steps of the process.

The adsorbents which are useful in providing the improved process described in accordance with this invention comprise those adsorbent materials which are themselves inert in contact with polymerized rosin or rosin esters under the conditions of treatment, as for example, fuller's earth, diatomaceous earth, activated carbon, activated alumina, bauxite, Filter Cel, silica gel, activated magnesium silicate, etc. The adsorbent is preferably substantially anhydrous. Calcining of the adsorbents, for example by heating at temperatures of about 75° C. to about 500° C. at atmospheric or reduced pressure will usually remove any moisture present. The contacting with the adsorbent may be carried out by passing the solution of the polymerized material to be refined through a bed of the adsorbent, or the adsorbent may be packed in a tower and the solution passed through the tower, or the solution may simply be agitated with the adsorbent and then drawn off. A series of filter beds or columns containing the adsorbent may be employed, thereby making it possible to conduct the operation continuously. If desired, the adsorbent may be revivified from time to time by treatment with an oxygenated solvent as methyl alcohol, acetone, etc. In a continuous system one or more of the beds or columns may be by-passed to permit recharging or revivification of the adsorbent without interrupting the treatment.

The amount of adsorbent used must be at least about 5 per cent and may amount to as much at 30 per cent by weight based on the weight of polymerized rosin or polymerized rosin ester treated. With an amount of adsorbent from 5 to about 10 per cent of the weight of the polymerized material the traces of catalyst will be substantially completely removed but the color will not be improved to the maximum degree. By use of an amount of adsorbent from about 10 per cent to about 30 per cent of the weight of polymerized material removal of the traces of catalyst will be effected and a high degree of color improvement will be realized.

The polymerization step of the process in accordance with this invention may be carried out on any of the various grades of wood or gum rosin or esters thereof by treatment with a mineral acid catalyst as sulfuric acid, organic substituted sulfuric acids, phosphoric acid, tetraphosphoric acid, etc., or by treatment with an acid sludge formed by treatment of rosin with sulfuric acid such as is described in an application of Clell E. Tyler, Serial No. 328,864, filed April 10, 1940. The polymerization is usually carried out by treatment of the rosin or rosin ester dissolved in a suitable inert organic solvent. Polymerized rosins ranging in melting point from about 85° C. to about 175° C. by the drop method may be prepared.

In treating rosin esters in accordance with the process of this invention any monohydric or polyhydric alcohol esters of rosins which have been prepared by any of the methods well known in the art may be used. These will include the methyl, ethyl, propyl, butyl, ethylene glycol, propylene glycol, glycerol, pentaerythritol, etc. esters of the various rosins and rosin acids.

The solvent for the rosin or rosin ester which may be used in the polymerization step of the process will usually be one of the inert solvents normally used in the polymerization treatment of rosin or rosin esters with mineral acids. Suitable inert solvents are the saturated petroleum hydrocarbons as butane, petroleum ether, gasoline, hexane, etc.; aromatic hydrocarbons as benzene, toluene, xylene; cyclic hydrocarbon solvents as cyclohexane, paramenthane, tetrahydronaphthalene, decahydronaphthalene; and chlorinated solvents as ethylene dichloride, etc. The solvent used in the polymerization step is generally also satisfactory in the refining step. The most preferable solvents are the saturated petroleum hydrocarbons and aromatic hydrocarbons. The solvent may be removed after completion of the polymerization and washing steps and replaced by another inert solvent for the treatment with adsorbent, if desired. Also, additional solvent may be added in the refining step to provide the desired viscosity. Thus the concentration of the polymerized material in the solvent to provide satisfactory viscosity for proper handling in the refining step will generally be within the range of about 5% to about 70% by weight, and preferably about 10% to about 35%. The contacting treatment with the adsorbent will be carried out at relatively low temperatures, as for example about 0° C. to about 100° C., and preferably about 10° C. to about 35° C. It will be found advantageous to carry out the treatment in an inert atmosphere such as provided by carbon dioxide or nitrogen to provide the highest degree of refining.

The following examples illustrate the various embodiments of the process. All parts given in the examples are parts by weight unless otherwise indicated.

*Example I*

Thirty-five hundred parts of a 50% by weight solution of K wood rosin in benzene were treated with 438 parts of 95% sulfuric acid for 45 minutes at a temperature of 15 to 22° C. The acid sludge which separated was then removed from the polymerized rosin solution, the solution was diluted with 900 parts of benzene and then treated with 2000 parts of 20% aqueous sulfuric acid at a temperature of 80° C. for one hour to hydrolyze emulsifying constituents. The solution was then diluted further with 2600 parts benzene to give a solution of 25% concentration and the latter washed thoroughly with water to remove the acid and other water-soluble constituents, then dried with anhydrous sodium sulfate. The washed and dried solution of polymerized rosin so obtained was then passed through a packed column of calcined fuller's earth containing an amount of fuller's earth equal to 10% of the weight of polymerized rosin in the solution. After removal of the solvent by evaporation under reduced pressure a polymerized rosin having a color of I, a melting point of 113° C., an acid number of 152, and a sulfur content of .007% resulted. The polymerized rosin prior to the fuller's earth treatment contained 0.016% sulfur and had a color of H.

*Example II*

Sixty-four hundred parts of a 25% solution of K wood rosin in benzene were treated with 400 parts of 95% sulfuric acid for one hour at a temperature of 18 to 20° C. The reaction mixture without separation of the sludge was diluted with 1000 parts of water with agitation at 20° C. and the mixture heated for one hour at 80° C. The aqueous layer was removed and the solution then washed thoroughly with water to remove the residual acid. After drying the solution with anhydrous sodium sulfate it was passed through a packed column of fuller's earth as in Example I. The polymerized rosin recovered after removal of solvent had a color of H, a melting point of 105° C., an acid number of 157, and a sulfur content of .004%. The polymerized rosin before the fuller's earth treatment had a color of F+ and a sulfur content of 0.009%.

*Example III*

To a solution of 400 parts of WG gum rosin in 157 parts of narrow range gasoline having a boiling range of 95–130° C., 100 parts of 85% sulfuric acid were added with agitation over a period of ½ hour maintaining the temperature at 30–32° C. The homogeneous reaction mixture obtained was agitated for 1½ hours at the same temperature and the reaction mixture then poured into 74 parts of the narrow range gasoline with agitation. The mixture separated into a gasoline layer and an acid layer. The acid layer was drawn off and the gasoline layer washed with water. A curd-like portion formed during the water washing. The washed solution containing the curd was dried and then treated with 40 parts of calcined alumina of 120–150 mesh by passing the solution through a column of the alumina. The curd particles were completely removed by the treatment and the polymerized rosin resulting after evaporation of the solvent had an acid number of 151, a melting point of 115° C., a color of WW and contained 0.008% of sulfur as compared with 0.05% sulfur without the alumina treatment.

Example IV

A 30% solution of K wood rosin in benzene was treated with about 15% its weight of 97% sulfuric acid at a temperature of 15 to 18° C. to form an acid sludge catalyst. A continuous flow of the rosin solution was then contacted with the above acid sludge catalyst at a temperature of 15 to 18° C. at such a rate as to provide contact sufficient to give a polymerized rosin of melting point of about 100° C. in accordance with the process described in an application of Clell E. Tyler, Serial No. 328,864, filed April 10, 1940. The polymerized rosin solution was then heated with 1/3 its weight of 50% sulfuric acid at 80° C. for one hour to facilitate water washing without emulsion formation. The polymerized rosin solution was then washed thoroughly with water and the solution dried with anhydrous sodium sulfate. Then 2000 parts of the solution were passed through a column of 200 parts of calcined fuller's earth and the solvent evaporated. The polymerized rosin obtained had the following characteristics in comparison with the polymerized rosin obtained without the fuller's earth treatment.

|  | Without fuller's earth treatment | With fuller's earth treatment |
| --- | --- | --- |
| Acid No. | 161 | 163 |
| Melting point (drop) °C | 104 | 104 |
| Color | I | I+ |
| Percent sulfur | 0.022 | 0.004 |

It will be apparent from the above description and illustrative examples that the described process provides a highly desirable means of producing polymerized rosins and polymerized rosin esters with use of mineral acid polymerization catalysts which are substantially free from contamination by traces of the catalyst. The polymerized rosins and rosin esters heretofore prepared with use of such mineral acid catalysts have invariably contained injurious small traces of the acid catalyst in spite of the particular precautions which have been exercised in the water washing procedures. These contaminating traces of catalyst have not been removable by any of the procedures which have been heretofore used. The process defined by this invention is thus highly advantageous and provides superior polymerized rosins and rosin esters to those previously possible with use of mineral acid polymerization catalysts.

This application is a continuation-in-part of my application Serial No. 378,938 filed February 14, 1941.

What I claim and desire to protect by Letters Patent is:

1. A method for the production of a material selected from the group consisting of polymerized rosin and polymerized rosin esters in highly refined form which comprises contacting a material selected from the group consisting of rosin and rosin esters dissolved in an inert organic solvent therefor with a mineral acid polymerization catalyst to effect polymerization thereof, separating the catalyst from the solution of the polymerized product, washing the said solution with water to remove all but the last traces of the polymerization catalyst, treating the washed solution to remove the water present therein, contacting the dried substantially anhydrous solution of the polymerized material containing contaminating traces of catalyst in addition to color bodies with from about 5 to about 30 per cent by weight based on the weight of polymerized material of an adsorbent at a temperature within the range of about 0° to about 100° C. for a sufficient period of time to remove the traces of catalyst from the polymerization product, and recovering the said polymerization product in a highly refined state from the said solution.

2. A method for the production of a highly refined polymerized rosin which comprises contacting a solution of rosin in an inert organic solvent therefor with a mineral acid polymerization catalyst to effect polymerization thereof, separating the catalyst from the polymerized rosin solution, washing the said solution with water to remove all but the last traces of the polymerization catalyst, treating the washed solution to remove the water present therein, contacting the dried substantially anhydrous solution of the polymerized rosin containing contaminating traces of catalyst in addition to color bodies with from about 5 to about 30 per cent by weight based on the weight of polymerized rosin of an adsorbent at a temperature within the range of about 0° to about 100° C. for a sufficient period of time to remove the traces of the catalyst from the polymerized rosin and recovering polymerized rosin in a highly refined state from the said solution.

3. A method for the production of a highly refined polymerized rosin which comprises contacting a solution of rosin in an inert organic solvent therefor with a mineral acid polymerization catalyst to effect polymerization thereof, separating the catalyst from the polymerized rosin solution, washing the said solution with water to remove all but the last traces of the polymerization catalyst, treating the washed solution to remove the water present therein, contacting a dried substantially anhydrous solution containing from about 5% to about 70% by weight of the polymerized rosin containing contaminating traces of catalyst in addition to color bodies with from about 5 to about 30 per cent by weight based on the weight of polymerized rosin of an adsorbent at a temperature within the range of about 0° to about 100° C. for a sufficient period of time to remove the traces of the catalyst from the polymerized rosin and recovering polymerized rosin in a highly refined state from the said solution.

4. A method for the production of a highly refined polymerized rosin which comprises contacting a solution of rosin in an inert organic solvent therefor with a mineral acid polymerization catalyst to effect polymerization thereof, separating the catalyst from the polymerized rosin solution, washing the said solution with water to remove all but the last traces of the polymerization catalyst, treating the washed solution to remove the water present therein, contacting a dried substantially anhydrous solution containing from about 5% to about 70% by weight of the polymerized rosin containing contaminating traces of catalyst in addition to color bodies with from about 5 to about 30 per cent by weight based on the weight of polymerized rosin of fuller's earth at a temperature within the range of about 0° to about 100° C. for a sufficient period of time to remove the traces of the catalyst from the polymerized rosin and recovering polymerized rosin in a highly refined state from the said solution.

5. A method for the production of a highly refined polymerized rosin which comprises contacting a solution of rosin in an inert organic solvent therefor with a mineral acid polymerization catalyst to effect polymerization thereof, separating the catalyst from the polymerized rosin solution, washing the said solution with water to remove all but the last traces of the polymerization catalyst, treating the washed solution to remove the water present therein, contacting a dried substantially anhydrous solution containing from about 5% to about 70% by weight of the polymerized rosin containing contaminating traces of catalyst in addition to color bodies with from about 5 to about 30 per cent by weight based on the weight of polymerized rosin of activated carbon at a temperature within the range of about 0° to about 100° C. for a sufficient period of time to remove the traces of the catalyst from the polymerized rosin and recovering polymerized rosin in a highly refined state from the said solution.

6. A method for the production of a highly refined polymerized rosin which comprises contacting a solution of rosin in an inert organic solvent therefor with a mineral acid polymerization catalyst to effect polymerization thereof, separating the catalyst from the polymerized rosin solution, washing the said solution with water to remove all but the last traces of the polymerization catalyst, treating the washed solution to remove the water present therein, contacting a dried substantially anhydrous solution containing from about 5% to about 70% by weight of the polymerized rosin containing contaminating traces of catalyst in addition to color bodies with from about 5 to about 30 per cent by weight based on the weight of polymerized rosin of alumina at a temperature within the range of about 0° to about 100° C. for a sufficient period of time to remove the traces of the catalyst from the polymerized rosin and recovering polymerized rosin in a highly refined state from the said solution.

7. A method for the production of a highly refined polymerized rosin which comprises contacting a solution of rosin in an inert organic solvent therefor with a sulfuric acid type polymerization catalyst to effect polymerization thereof, separating the catalyst from the polymerized rosin solution, washing the said solution with water to remove all but the last traces of the polymerization catalyst, treating the washed solution to remove the water present therein, contacting a dried substantially anhydrous solution containing from about 5% to about 70% by weight of the polymerized rosin containing contaminating traces of catalyst in addition to color bodies with from about 5 to about 30 per cent by weight based on the weight of polymerized rosin of an adsorbent at a temperature within the range of about 0° to about 100° C. for a sufficient period of time to remove the traces of the catalyst from the polymerized rosin and recovering polymerized rosin in a highly refined state from the said solution.

8. A method for the production of a highly refined polymerized rosin which comprises contacting a solution of rosin in an inert organic solvent therefor with a sulfuric acid type polymerization catalyst to effect polymerization thereof, separating the catalyst from the polymerized rosin solution, washing the said solution with water to remove all but the last traces of the polymerization catalyst, treating the washed solution to remove the water present therein, contacting a dried substantially anhydrous solution containing from about 5% to about 70% by weight of the polymerized rosin containing contaminating traces of catalyst in addition to color bodies with from about 5 to about 30 per cent by weight based on the weight of polymerized rosin of fuller's earth at a temperature within the range of about 0° to about 100° C. for a sufficient period of time to remove the traces of the catalyst from the polymerized rosin and recovering polymerized rosin in a highly refined state from the said solution.

9. A method for the production of a highly refined polymerized rosin which comprises contacting a solution of rosin in an inert organic solvent therefor with a mineral acid polymerization catalyst to effect polymerization thereof, separating the catalyst from the polymerized rosin solution, washing the said solution with water to remove all but the last traces of the polymerization catalyst, treating the washed solution to remove the water present therein, contacting the dried substantially anhydrous solution of the polymerized rosin containing contaminating traces of catalyst in addition to color bodies with from about 5 to about 30 per cent by weight based on the weight of polymerized rosin of fuller's earth by passing the solution through a bed of fuller's earth at a temperature within the range of about 0° to about 100° C. for a sufficient period of time to remove the traces of the catalyst from the polymerized rosin and recovering polymerized rosin in a highly refined state from the said solution.

10. A method for the production of a highly refined polymerized rosin which comprises contacting a solution of rosin in an inert organic solvent therefor with a mineral acid polymerization catalyst to effect polymerization thereof, separating the catalyst from the polymerized rosin solution, washing the said solution with water to remove all but the last traces of the polymerization catalyst, treating the washed solution to remove the water present therein, contacting the dried substantially anhydrous solution of the polymerized rosin containing contaminating traces of catalyst in addition to color bodies with from about 5 to about 30 per cent by weight based on the weight of polymerized rosin of fuller's earth continuously by passing the solution through a bed of fuller's earth at a temperature within the range of about 0° to about 100° C. for a sufficient period of time to remove the traces of the catalyst from the polymerized rosin, revivifying the fuller's earth by treatment with an oxygenated solvent without interrupting the flow of the polymerized rosin solution and recovering polymerized rosin in a highly refined state from the said solution.

ALFRED L. RUMMELSBURG.